July 18, 1950      J. C. DOYLE      2,515,952
APPARATUS FOR MOLDING CONFECTIONS
Filed May 8, 1948
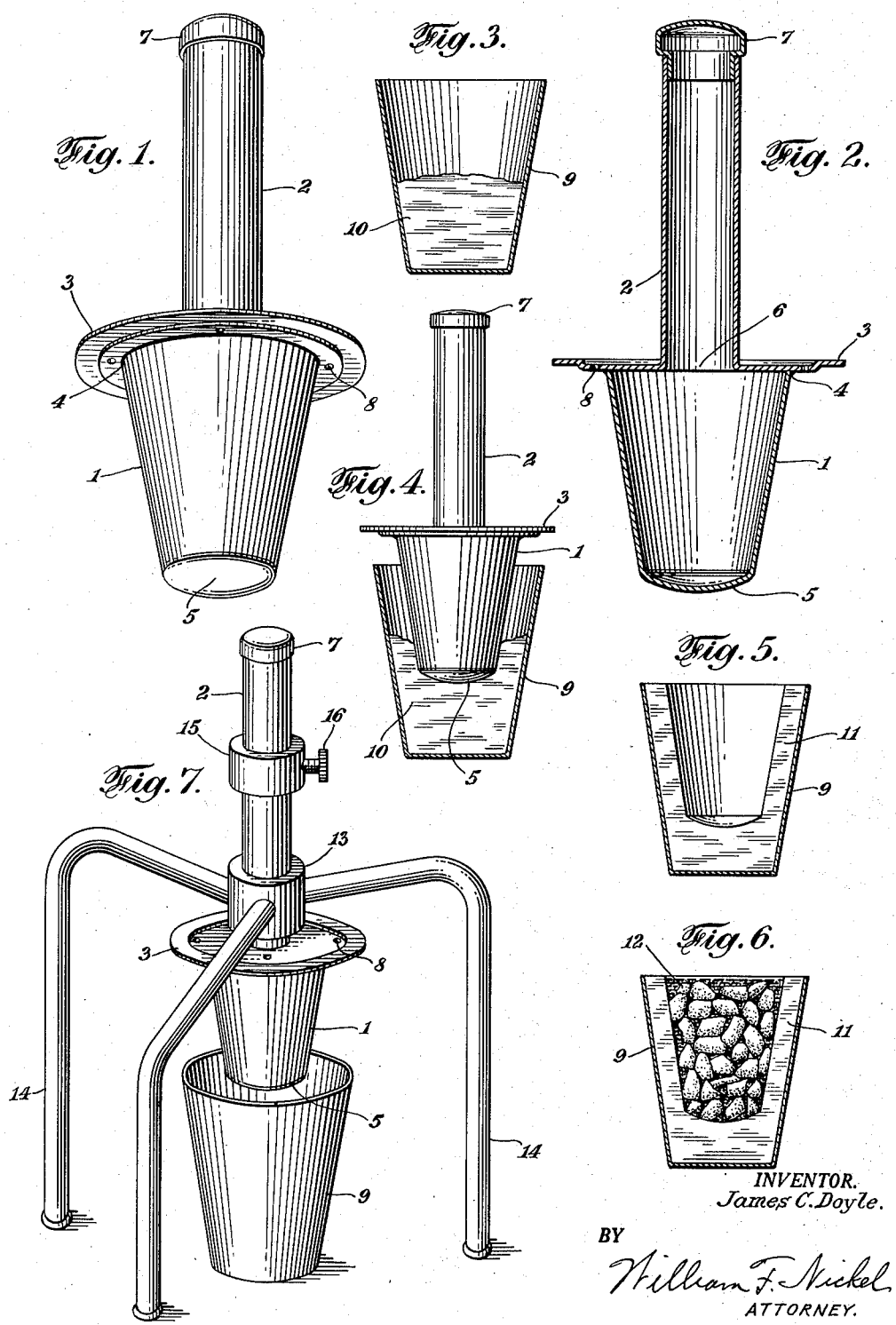
INVENTOR.
James C. Doyle.
BY
William F. Nickel
ATTORNEY.

Patented July 18, 1950

2,515,952

UNITED STATES PATENT OFFICE 2,515,952

APPARATUS FOR MOLDING CONFECTIONS

James C. Doyle, Hollis, N. Y.

Application May 8, 1948, Serial No. 25,903

2 Claims. (Cl. 107—47)

My invention is an improved apparatus for molding semi-plastic confections, such as frozen ice cream and the like, into forms that enable them to be readily combined with other edible materials.

An important object of the invention is to provide a simple device, easy and inexpensive to fashion and operate, for quickly transforming a mass of ice cream into a hollow body that can be filled with nuts, pieces of fruit and other sweetmeats to make a tempting and well flavored viand.

In its preferred embodiment the invention comprises a flanged plunger and handle, both of which are preferably hollow to receive a liquid capable of radiating the required amount of heat to prevent the ice cream from adhering to the implement. This is employed in combination with an open container into which a quantity of ice cream has been placed, to spread the ice cream in a layer of desired thickness upon the bottom and sides of the container, giving it a cup-like shape adapted to receive whatever filling material the dealer or consumer wishes to add in finishing the article.

The nature and advantages of the improvement are clearly described in the following specification and the novel features are pointed out in the claims. But this disclosure is explanatory only; and I may vary the details in many respects without departing from the general design that contains the essential characteristics of the invention.

On the drawings:

Figure 1 is a perspective view of an implement employed with my invention;

Figure 2 is a longitudinal section thereof;

Figures 3, 4 and 5 illustrate steps in the performance of my improved method;

Figure 6 shows the finished product; and

Figure 7 shows an accessory that can be utilized with said implements.

The equipment for the practice of my invention comprises a plunger consisting of a head 1 and a handle 2. At one end of the handle is a wide flange or disk 3, to which the head 1, of relatively large diameter is secured, as by welding shown at 4, or otherwise. The head is conical, tapering to its smaller diameter at the outer end, which is rounded as shown at 5. The head and handle are both hollow and the interior spaces are in communication by way of an opening 6 in the end of the handle 2 adjacent the flanges or disk 3.

The outer end of the handle has a closure 7, and the flange 3 beyond the periphery of the head 1 has several small openings 8.

The plunger is operated in conjunction with a container 9 of paper or other material to serve as a form for the ice cream or the like, a mass of which is put in on the bottom as indicated at 10. The plunger is then forced into the mass, being held by the handle 2. The head is of course somewhat smaller in diameter than the cup and the pressure of the head on the mass 10 forces the mass to spread upward and coat the inside of the cup with a layer thick enough to make a hollow body or shell 11 open at the top. This shell is then filled, as shown at 12 in Figure 6. It is next frozen solid.

The plunger can be filled with water or some other heat conducting fluid which will be warmed by contact with the operator's hand so that the head 1 will not stick to the ice cream in the cup. The plunger can be manipulated to advantage by turning it, and the openings 8 in the rim of the flange 3 will eliminate any suction that would pull out part of the ice cream when the plunger is extracted.

The plunger will usually be nearly as large as the cup, but the plunger can be utilized with smaller cups, especially cups of less height, by means of the stand illustrated in Figure 7. This stand has a round central bearing 13 to which are affixed legs 14 extending away from the bearing and downward. The plunger is slipped into the bearing 13 from below, and the head 1 is surrounded by the legs 14. A container with ice cream or like in it is disposed under the plunger and within the compass of the legs 14. On the handle 2 of the plunger above the bearing 13 is slipped a stop collar 15, adjustably secured by a binding screw 16. This collar limits the downstroke of the head 1 so that it does not approach too closely the bottom of the container 4.

In practice the head is forced into the mass 10 far enough to carry the flange 3 into the rim of the container, or against the rim; and thus the flange 3 acts as a guide to center the plunger when the mass 10 is molded. Many paper cups are made with an inside shoulder just below the rim, and this shoulder will serve as a stop for the flange 3.

When smaller cups are filled the stand shown in figure is quite useful, and the plunger can be supported and turned by bearing 13 and collar 15 above the rim of the container 3.

Having described my invention, what I believe to be new is:

1. Apparatus of the kind described comprising a hollow plunger head with a closed end, a hollow handle attached to the head at said end, a relatively wide flange at the junction of the handle and head extending beyond the periphery of the head, said head and said handle having their interior spaces in communication, and a removable closure for the outer end of the handle for the admission and removal of a heat containing medium, said head tapering away from said flange and being smaller and rounded at the opposite end thereof, the extended portion of the flange having openings therethrough to eliminate suction under the flange when the head is rotated in a plastic mass below the flange.

2. Apparatus of the kind described comprising a hollow plunger head with a closed end, a hollow handle attached to the head at said end, a relatively wide flange at the junction of the handle and head extending beyond the periphery of the head, said head and said handle having their interior spaces in communication, and containing a heat bearing medium, said head tapering away from said flange and being smaller and rounded at the opposite end thereof, the extended portion of the flange having openings therethrough to eliminate suction under the flange when the head is rotated in a plastic mass below the flange.

JAMES C. DOYLE.

REFERENCES CITED

The following references are of record in the file of this patent:

UNITED STATES PATENTS

| Number | Name | Date |
|---|---|---|
| 913,597 | Westling | Feb. 23, 1909 |
| 1,219,711 | Davoust | Mar. 20, 1917 |
| 1,274,349 | Bateson | July 30, 1918 |
| 1,302,733 | Turnbull | May 6, 1919 |
| 1,472,229 | Plempel | Oct. 30, 1923 |
| 1,647,944 | Villasenor | Nov. 1, 1927 |
| 1,719,931 | Hall | July 9, 1929 |
| 2,004,530 | Howe et al. | June 11, 1935 |
| 2,007,572 | Jancsy | July 9, 1935 |
| 2,409,021 | Dale | Oct. 8, 1946 |

FOREIGN PATENTS

| Number | Country | Date |
|---|---|---|
| 23,155 | Great Britain | Oct. 14, 1913 |
| 322,456 | Great Britain | Dec. 3, 1929 |